United States Patent [19]

Kobayashi

[11] Patent Number: 5,441,543
[45] Date of Patent: Aug. 15, 1995

US005441543A

[54] METHOD OF DYEING A SYNTHETIC FIBER-MATERIAL AND DYED SYNTHETIC FIBER MATERIAL

[75] Inventor: Shigenobu Kobayashi, Toyonaka, Japan

[73] Assignee: Teijin Limited, Osaka, Japan

[21] Appl. No.: 114,699

[22] Filed: Sep. 1, 1993

[30] Foreign Application Priority Data

Sep. 3, 1992 [JP] Japan .................. 4-235638

[51] Int. Cl.⁶ .............. C08J 3/20; C08K 5/00; C09B 67/00
[52] U.S. Cl. ........................... 8/585; 8/602; 8/922
[58] Field of Search .............. 8/585, 602, 922, 550, 8/41 A, 588, 442, 495

[56] References Cited

U.S. PATENT DOCUMENTS

| | | | |
|---|---|---|---|
| 3,951,591 | 4/1976 | Birke et al. | 8/41 A |
| 4,069,198 | 1/1978 | Ibbotson . | |
| 4,280,814 | 7/1981 | Bond | 8/588 |
| 4,500,320 | 2/1985 | Grunert et al. | 8/442 |
| 4,723,960 | 2/1988 | Shirasana et al. | 8/495 |

FOREIGN PATENT DOCUMENTS

| | | |
|---|---|---|
| 552481 | 5/1957 | Belgium . |
| 61-275487 | 12/1986 | Japan . |
| 1244255 | 8/1971 | United Kingdom . |

OTHER PUBLICATIONS

Abstract of Japanese Patent Application J 56151737 (1980).
Abstract of Japanese Patent Application J 59071487 (1982).

*Primary Examiner*—Arthur C. Prescott
*Attorney, Agent, or Firm*—Burgess, Ryan & Wayne

[57] ABSTRACT

A synthetic fibers having a melting or softening temperature of 160° C. or more, for example, polyester fibers, are dyed with an organic coloring material having a molecular weight of 370 or more, for example, disperse dye, vat dye and phthalocyanine pigment, at a temperature of 150° C. or more, at a high color depth, and the resultant dyed product exhibits a high color fastness to washing or light.

18 Claims, No Drawings

METHOD OF DYEING A SYNTHETIC FIBER-MATERIAL AND DYED SYNTHETIC FIBER MATERIAL

BACKGROUND OF THE INVENTION

1. Field of the Invention

The present invention relates to a method of dyeing a synthetic fiber material and a dyed synthetic fiber material.

More particularly, the present invention relates to a method of dyeing a synthetic fiber material with an organic coloring material at a high temperature to produce deeply and evenly colored synthetic fiber material having a significantly enhanced color fastness, and a dyed synthetic fiber material.

2. Description of the Related Art

It is well known that synthetic fiber materials, for example, fabrics, are employed not only for various types of clothes but also for various types of industrial materials. Almost all of the synthetic fiber materials are colored. Also, a major portion of the colored synthetic fiber materials are produced by a dyeing method using a dye, whereas a minor portion of the colored synthetic fiber materials are produced by a printing method or dope-coloring method in which a pigment is mixed with a synthetic polymer material.

Recently, various fabrics are produced from combined filament yarns containing extremely fine synthetic fibers or two or more types of synthetic fibers different in dyeing property from each other, and become widely employed in various uses. Accordingly, there is a strong demand for developing a new method of dyeing the synthetic fiber materials at a high color depth and at a high evenness.

For example, the extremely fine fibers have a large total surface area per unit weight of the fibers, and thus light irradiated on the extremely fine fibers is reflected on a large total surface area. Therefore, when the same amount of dye is adsorbed in the fibers, the color depth of the dyed extremely fine fibers appears lower than that of fibers having a higher diameter than that of the extremely fine fibers. Accordingly, various methods for dyeing the extremely fine fibers at a high color depth are developed.

In the most simple method, the amount of dye to be applied to the fibers is increased so as to increase the amount of the dye to be adsorbed by the fibers. This method is, however, disadvantageous in that the dyeing cost becomes high, and in the dyed fibers, an increase in the amount of the dye adsorbed in the fibers causes the amount of the dye desorbed from the dyed fibers to be increased, in other words, the increase in the absorbed dye amount results in a reduction in washing fastness of the dyed fibers.

It is known that hydrophilic synthetic fibers having a high crystallinity, for example, polyester fibers, can be dyed with a water-insoluble disperse dye by a carrier dying method in which an additive, for example, acetophenone or o-phenylphenol, is used as a carrier. This carrier dyeing method is, however, disadvantageous in that the removal of the carrier from the dyed fibers is difficult, the dyed fibers are deteriorated by the carrier, the waste water containing the carrier has a bad odor and is harmful to the environment, and the treatment of the waste water is difficult.

To eliminate the above-mentioned disadvantages, Japanese Unexamined Patent Publication (Kokai) No. 59-71,487 discloses a method of dyeing a false-twisted yarn of a cationic dye-dyeable polyester filaments with a cationic dye at a temperature of 120° C. or more. This method is characterized only in that the cationic dye having higher wet color fastness and sublimation color fastness than those of disperse dye is used to prevent a reduction in color fastness of a dyed filament yarn material after a resin treatment is applied thereto. Therefore, when the dyeing method is applied to the extremely fine fiber material, it is impossible to obtain both the high dyeability (color depth) and the high washing fastness of the dyed fiber material.

Further, when a composite yarn material comprising two or more types of fibers different in dyeability are dyed, the different types of fibers are dyed with the dye at different dyeing rates from each other, and thus the dyed fibers are different in hue and color depth from each other. The resultant dyed composite yarn material exhibits a melange (sprinkly) colored appearance.

SUMMARY OF THE INVENTION

An object of the present invention is to provide a method of dyeing a synthetic fiber material, for example, an extremely fine fiber material or composite yarn material comprising two or more types of fibers different in dyeing property from each other, with an enhanced leveling and with a high dye-adsorption, and a dyed synthetic fiber material.

Another object of the present invention is to provide a method of dyeing a synthetic fiber material to produce a dyed synthetic fiber material having an enhanced color fastness, especially a high washing fastness, and a dyed synthetic fiber material.

The above-mentioned objects can be attained by the method of the present invention for dyeing a synthetic fiber material, comprising bringing a synthetic fiber material having a melting or softening temperature of 160° C. or more into contact with an organic coloring material having a molecular weight of 370 or more at a temperature of 150° C. or more.

DESCRIPTION OF THE PREFERRED EMBODIMENTS

In the research for attaining the above-mentioned objects, the inventor of the present invention found that a heat-resistant synthetic fiber material can be dyed with a water-insoluble organic coloring material, for example, dye or pigment, having a specific molecular weight at a high diffusing rate of the coloring material, by applying a specific dyeing temperature which is significantly higher than conventional dyeing temperature. Also, it was found by the inventor that in the dyeing method of the present invention, the coloring material can diffuse into semicrystalline segments of the synthetic fibers, which have a relatively dense intermolecular structure, and in which the coloring material could not be exhausted by a conventional dyeing method, and can be fixed in the segments. Therefore, the resultant dyed synthetic fiber material exhibits a high leveling, a high color depth and an enhanced color fastness.

The dyeing method of the present invention is applied to a heat synthetic fiber material having a melting or softening temperature of 160° C. or more, preferably 160° C. to 300° C. The synthetic fibers are preferably selected from the group consisting of polyester fibers, cationic dye-dyeable polyester fibers, polyamide fibers, polyvinyl chloride fibers, and polyacrylonitrile fibers. Most preferable synthetic fibers are polyester fibers having a melting temperature of 200° C. or more. Also, the effect of the dyeing method of the present invention can be highly manifested when applied to an extremely fine fiber material.

The extremely fine fibers having a thickness of 0.2 denier or less, preferably 0.0001 to 0.1 denier, can be produced by a conventional process in which mix-spun composite fibers are produced from two or more types of synthetic polymers incompatible with each other, and at least one polymer is removed from the composite fibers, or by another conventional process in which alternately arranged multi-segment composite fibers are dissolve-divided into individual segment fibers.

As far as the objects of the present invention can be attained, the synthetic polymer for the heat-resistant synthetic fibers may be a copolymer with an additional comonomer component effective for improving a certain property of the fibers, for example, 5-sodium sulfoisophthalate which is effective for imparting a cationic dye-dyeability to polyester fibers.

The polyester fibers usable for the method of the present invention optionally contain a thermal decomposition-preventing agent comprising at least one isourea compound of the formula (I):

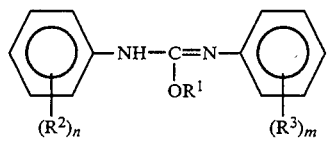

(I)

wherein $R^1$, $R^2$ and $R^3$ respectively and independently from each other represent a member selected from the group consisting of unsaturated and saturated aliphatic hydrocarbon groups having 1 to 20 carbon atoms, aromatic hydrocarbon groups having 6 to 10 carbon atoms and cycloaliphatic hydrocarbon groups having 5 to 10 carbon atoms, m and n respectively and independently from each other represent an integer of 1 to 5, and when m or n represents an integer of 2 to 5, the hydrocarbon groups represented by $R^2$ or $R^3$ may be the same as or different from each other, and reacted with the polyester polymer.

In the formula (I), the hydrocarbon groups represented by $R^2$ or $R^3$ may be attached to the benzene rings at o-, m- and/or p-positions with respect to the nitrogen atom attached to the benzene rings.

The isourea compound of the formula (I) is reacted in an amount of 0.05 to 5% by weight to the polyester polymer.

The isourea compound of the formula (I) has a higher reactivity than 2,6,2',6'-tetraisopropyldiphenylcarbodiimide and thus reacts with the terminal carbonyl groups of the polyester molecules to significantly reduce the content of the terminal carbonyl groups in the polyester molecules.

The resultant polyester polymer exhibits a high resistance to hydrolysis thereof when a wet treatment is applied thereto.

The isourea compound of the formula (I) is preferably employed in an amount of 0.005 to 5 parts by weight per 100 parts by weight of the polyester polymer.

When the isourea compound of the formula (I) is used in an amount of less than 0.005 parts by weight, the resultant thermal decomposition-preventing effect is unsatisfactory. Also, when the isourea compound is used in an amount of more than 5 parts by weight, the thermal decomposition-preventing effect is saturated.

The isourea compound is employed more preferably in an amount of from 0.1 to 4 parts by weight, still more preferably from 0.2 to 3.5 parts by weight, and further preferably from 0.3 to 3 parts, per 100 parts by weight of the polyester polymer.

The isourea compound of the formula (I) is reacted with the polyester polymer. This reaction can be effected for example, (1) by mixing the isourea compound into a melt of the polyester polymer to cause at least a portion of the isourea compound to react with the polyester polymer, or (2) after the mixing, subjecting the resultant mixture to a shaping procedure and then to a heat-treatment to cause a non-reacted portion of the isourea compound to react with the polyester polymer, or (3) impregnating a shaped polyester polymer article with the isourea compound and heat-treating the impregnated article. The above-mentioned reacting manner (1) is most preferable.

When the polyester polymer is polyethylene terephthalate, the reaction temperature of the isourea compound thereto is preferably from 150° C. to 320° C., more preferably from 200° C. to 300° C., still more preferably from 240° C. to 290° C. The preferable reaction temperature is variable depending on the type of the polyester polymer.

The reaction of the isourea compound with the polyester polymer may be carried out under an raised pressure. This reaction is, however, preferably carried out under the ambient atmospheric pressure or a reduced pressure.

The reaction time for the isourea compound with the polyester polymer is variable depending to the type and shaping method of the polyester polymer. When the reaction is carried out at the above-mentioned temperature range, the reaction can be completed by mixing the isourea compound into the melt of the polyester polymer and stirring the mixture for a time of 30 minutes or less, preferably 15 minutes or less. In the resultant polyester fiber material, it is allowable that the entire amount of the isourea compound added to the polyester polymer is not completely reacted with the terminal carboxyl groups of the polyester molecules and a certain amount of the isourea compound remains in a non-reacted form in the polyester polymer. In some cases, the non-reacted isourea compound contained in the polyester polymer is more effective for preventing the thermal decomposition of the polyester polymer than the reacted isourea compound.

In the above-mentioned reaction manners, the mixture of the isourea compound of the formula (I) with the polyester polymer may be stirred in a polyesterpolymerization vessel, an extruder or a reactor type extruder. Alternatively, the isourea compound of the formula (I) is provisionally mixed at room temperature into a liquid polyester (which may be a terminal blocked polyester) in a medium consisting of, for example, a hydrogenated polybutadiene (which may be terminal-modified into —OH or —COOH groups), and the provisional mixture is mixed into a melt of a polyester polymer by an injection-blending method to allow the isourea compound to react with the polyester polymer. Namely, the isourea compound may be added to the melt of the polyester polymer in the melt-spinning procedure.

The isourea compound of the formula (I) can be mixed together with at least one additive, for example, ultra-violet absorbing agent, thermally stabilizing agents, flame-retarders, optical brightening agents, lubricants, nucleating additives, releasing agents, pigments and fillers.

The synthetic fiber material usable for the present invention may be employed in the form of filament yarns, spun yarns, blended filament or fiber yarns containing natural fibers, for example, cotton fibers, regenerated fibers, for example, viscose rayon fibers, and different type of synthetic fibers therefrom, or woven or knitted fabrics of the above-mentioned yarns.

The organic coloring material usable for the method of the present invention is preferably selected from organic dyes and pigments having a molecular weight of 370 or more, more preferably 370 to 1500.

The organic dyes can be selected from disperse dyes, vat dyes, cationic dyes, naphthol dyes, acid dyes and mordant dyes, preferably, from disperse dyes and vat dyes.

The organic pigments are preferably selected from phthalocyanine pigments, more preferably, metal-chelated phthalocyanine pigments.

Especially, disperse azoic dyes, vat dyes and metal-chelated phthalocyanine dyes are advantageously employed for the method of the present invention to provide a dyed synthetic fiber material having a high heat-resistance and a high color fastness.

The disperse azoic dyes usable for the method of the present invention are insoluble or less soluble in water and selected from those usable for dyeing polyester fibers and cellulose acetate fibers by conventional dyeing methods in which the disperse dyes dispersed in water are applied thereto.

The disperse azoic dyes include disperse benzene azo-dyes (for example, monoazo and disazo dyes), heterocyclic azoic dyes (for example, tiazoleazo, benzothiazoleazo, quinolinoazo, pyrizoneazo, imidazoleazo, thiopheneazo dyes, anthraquinone dyes and condensation dyes, for example, quinophthaline, stryl and coumarin dyes).

The vat dyes usable for the method of the present invention can be selected from those usable for dyeing cellulose or cellulose derivative fibers in a conventional vat dyeing method. The vat dyes include acylaminoanthraquinone, anthrimide, anthraquinone carbazole, anthraquinoneacrizone, anthraquinoneoxazole, anthraquinonethiazole, anthraquinone-N-hydrazin, pyrene, diazapyrene, perylene, indigo and thioindigo dyes, which have two or more carbonyl groups (>C=O) per molecule thereof and are insoluble in water. Generally, the vat dyes have a large molecular structure and exhibit a high fastness against visible light and ultraviolet rays.

When the vat dyes are applied to the cellulosic fiber material, the vat dyes are converted to corresponding leuco vat dyes which are soluble in water by reducing the vat dyes in an alkaline reducing liquid, the leuco vat dyes are adsorbed by the cellulosic fiber material, and then adsorbed leuco vat dyes are oxidized into the original water-insoluble vat dyes within the cellulosic fibers.

When the above-mentioned conventional vat dyeing method is applied to the synthetic fibers, for example, polyester fibers, no vat dyes are adsorbed by the synthetic fibers.

In the method of the present invention, the vat dyes can diffuse into and can be fixed in the inside of the synthetic fibers, at a dyeing temperature of 150° C. or more, preferably 160° C. or more.

The organic pigments usable for the dyeing method of the present invention are preferably selected from phthalocyanine pigments, particularly metal-chelated phthalocyanine pigments, for example, tetramethylisothiouronium metal-chelated phthalocyanine pigments of the general formula (II):

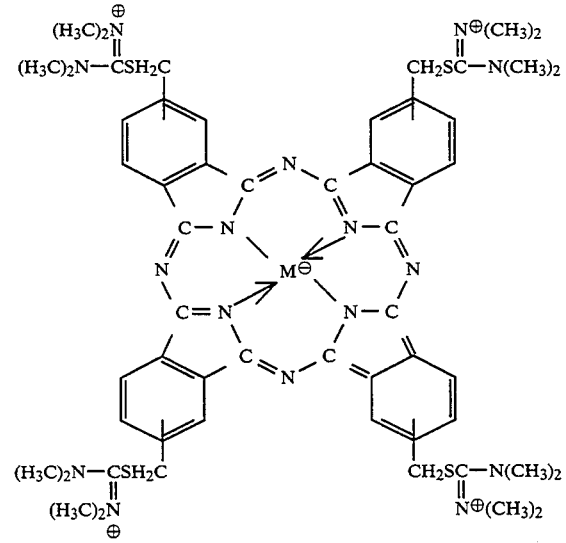

wherein M represents a member selected from the group consisting of copper (Cu), nickel (Ni), zinc (Zn), cobalt (Co), aluminum (Al), platinum (Pt), iron (Fe) and vanadium (V).

Usually, the phthalocyanine pigments are used as a coloring material for lacquers and the like, have a very large molecular structure and exhibits a very high fastness against visible light rays and ultraviolet rays.

Due to the large molecular structure, the phthalocyanine pigments are difficult to diffuse into the inside of synthetic fibers, for example, polyester fibers and thus cannot color the synthetic fibers at a conventional dyeing temperature of 130° C. or less.

However, in accordance with the method of the present invention, it becomes possible to dye the synthetic fiber material with the phthalocyanine pigments and thus dyed synthetic fiber material having a high light fastness can be obtained.

When the molecular weight of the organic coloring material is less than 370, even if the method of the present invention is applied, the resultant dyed synthetic fiber material exhibits an unsatisfactory color fastness for washing, because the coloring material adsorbed by the synthetic fiber material is easily desorbed in an aqueous medium. Also, the organic coloring material having a molecular weight of less than 370 exhibits an unsatisfactory resistance to thermal decomposition thereof. Usually, the dyeing rate of the organic coloring material decreases with an increase in the molecular weight thereof. Therefore, the molecular weight of the organic coloring material is preferably 1500 or less.

In the method of the present invention, the organic coloring material can be used together with an function-imparting agent, for example, an ultraviolet ray-absorbing agent and/or an antioxidant, which usually has a large molecular weight.

In the method of the present invention, those function-imparting agents having a large molecular weight can be diffused into and fixed in the inside of the synthetic fibers. Therefore, the function-imparting agents can be applied at a very high efficiency to the synthetic fiber material.

The synthetic fiber material to be subjected to the method of the present invention is scoured and heat treated. The pre-treated synthetic fiber material is brought into contact with an organic coloring material at a temperature of 150° C. or more, preferably 150° C. to 190° C. If the dyeing temperature is lower than 150° C., the synthetic fiber material cannot be colored at a high color depth (darkness) and the resultant dyed synthetic fiber material exhibits an unsatisfactory color fastness. When diffused into the inside of the synthetic fibers and fixed therein, the fixed organic coloring material having a large molecular weight of 370 or more is stably retained in the inside of the synthetic fibers and not easily desorbed from the synthetic fibers.

However, if the dyeing temperature is too high, the synthetic fibers are thermally deteriorated. Therefore, the dyeing temperature is preferably 190° C. or less.

The dyeing medium usable for the method of the present invention is not limited to a specific medium as long as the medium does not exhibit a high solubility for the organic coloring material. The most preferable dyeing medium is water. Water has a boiling temperature of 100° C. under an ambient atmospheric pressure. Therefore, to heat an aqueous dyeing system at a temperature higher than 100° C., it is necessary to carry out the dyeing procedure in a closed vessel (autoclave) under a raised pressure. The dyeing vessel must have a high pressure resistance, and preferably is resistive to a high pressure of at least 20 atmospheres. In the method of the present invention, there is no limitation in the concentration of the organic coloring material and the dyeing time. Generally, the adsorption of the organic coloring material in the synthetic fiber material increases with a raise in the dyeing temperature. Therefore, the amount of the organic coloring material to be employed and the dyeing time can be controlled by controlling the dyeing temperature. Generally, the organic coloring material is contained in a concentration of 1 to 50% by weight in the dyeing liquor and the dyeing time is adjusted to a level of 15 to 60 minutes.

After the dyeing procedure is completed, the dyed synthetic fiber material can be reduction-cleaned and-/or heat-treated by a conventional procedure.

In conventional dyeing theory, it is believed that a raise in dyeing temperature causes the diffusing rate of dye into the inside of fibers to be increased and thus when the dyeing procedure is ended within a practical dyeing time, the apparent dye absorption is increased, whereas the equilibrium dye adsorption is rather decreased.

The above-mentioned dyeing theory is applicable only for a dyeing procedure at a temperature of 130° C. or less, because in this dyeing procedure, the dye can diffuse only into non-crystalline regions of the fibers. Namely, in the conventional dyeing procedure, it is never attempted to cause the organic coloring material to diffuse into regions other than the non-crystalline regions of the fibers, and to stably fix in the other regions so as to obtain an enhanced color fastness to washing. For example, the above-mentioned Japanese Unexamined Patent Publication (Kokai) No. 57-71,487 discloses a high temperature dyeing method at a temperature of 120° C. or more. In this prior invention, it was attempted to increase the diffusing rate of the dye only into the non-crystalline regions of the fibers, but not into the semicrystalline regions thereof. In the prior invention, a heat treatment was applied to a polyester fiber yarn in a false-twisting step, before the dyeing procedure. This heat treatment resulted in a reduction in the non-crystalline regions. Therefore, to increase an apparent dye adsorption in the reduced non-crystalline regions in the polyester fibers, the dyeing procedure was carried out at a high temperature.

According to the results of the inventor's research directed to the relationship among the dyeing temperature, the dye adsorption, the molecular weight of the dye and the color fastness of the dyed fiber material to washing, it was confirmed that when the dyeing procedure with an organic coloring material was carried out at a temperature of 150° C., a thermal molecular movement in the semicrystalline regions of the synthetic fibers occurred, so as to provide new dyeing sites. Therefore, not only the adsorption of the organic coloring material increased, but also, the organic coloring material could diffuse into the inside of the fibers.

When an organic coloring material having a molecular weight of 370 or more is employed, the diffused organic coloring material is stably fixed in the inside (including the semicrystalline regions) of the fibers. Accordingly, after the dyed synthetic fiber material is taken up from the high temperature dyeing procedure, the fixed organic coloring material in the inside of the fibers is difficult to be desorbed at a washing temperature of several tens of degrees (°C.). The dyed synthetic fiber material exhibits an excellent color fastness to washing.

Namely, the method of present invention makes it possible to enhance both the absorption of the organic coloring material and the color fastness of the dyed synthetic fiber material to washing, which properties are considered in the conventional dyeing theory to be inconsistent with each other.

Also, as mentioned above, the dyeing time can be shortened by raising the dyeing temperature, the deterioration in physical properties of the synthetic fiber material can be minimized by controlling the heat-history of the synthetic fiber material.

In the case of dyeing a composite yarn material comprising two or more types of synthetic fiber yarns different in dyeability from each other, with an organic coloring material, the process of the present invention can prevent an undesirable melange coloring phenomenon. The melange coloring phenomenon occurs when the composite yarn material containing two or more types of fibers different in dyeing rate from each other is dyed in one and the same dyeing liquor and the resultant dyed fibers have different color depths and hues from each other. This phenomenon can be prevented by increasing the dyeing rate of one type of fibers which are lower in the dyeing rate thereof than that of the other type of fibers, and decreasing the dyeing rate of the other type of fibers which are higher in dyeing rate than that of the one type of fibers so that the all the types of the fibers exhibit the same dyeing rates and adsorptions of the organic coloring material as each other.

In the process of the present invention, the dyeing temperature of 150° C. or more is contributory to enhancing the diffusing rate of the organic coloring material into the low dyeing rate fibers, and the use of the specific organic coloring material having a molecular weight of 370 or more, is effective to control the diffusing rate and adsorption of the organic coloring material in the high dyeing rate fibers. Also the specific features of the method present invention cause the resultant dyed synthetic fiber material to exhibit a restricted desorption of the organic coloring material from the dyed material. Therefore, the dyed synthetic fiber composite yarn material can be evenly dyed without occurrence of the melange coloring phenomenon.

In an embodiment of the present invention, a polyester fiber material is dyed with a disperse azoic dye in accordance with the method of the present invention and the resultant dyed polyester fiber material exhibits:

(1) an optical density of 60 or more, determined in accordance with the equation (a):

$$A = A' - A'' \tag{a}$$

wherein A represents the optical density of the dyed synthetic fiber material, A' represents an optical density of a solution of the dyed polyester fiber material calculated from the equation (b):

$$A' = -(\log T)/B \tag{b}$$

in which T represents a light transmittance of a solution of the dyed polyester fiber material in a solvent consisting of o-chlorophenol and B represents a weight in g of the dyed polyester fiber material contained in the solution in an amount of 50 ml, and A'' represents the optical density of a solution of the non-dyed polyester fiber material in an amount of 1g in the same solvent as mentioned above in an amount of 50 ml; and calculated from the equation (c):

$$A'' = \log T' \tag{c}$$

in which T' represents a light transmittance of the solution of the non-dyed polyester fiber material; and (2) a degree of staining of undyed nylon 6 fabric of 8.0 or less, determined by a laundering color fastness test applied to the dyed polyester fiber material in accordance with Japanese Industrial Standard L 0844, A-2 method, which degree of staining being represented by a color difference between the stained nylon 6 fabric attached as an adjacent fabric to the dyed polyester fiber material and a non-stained nylon 6 fabric, calculated in accordance with equation (d):

$$\Delta E^*w = \{(\Delta L^*w)^2 + (\Delta a^*w)^2 + (\Delta b^*w)^2\}^{\frac{1}{2}} \tag{d}$$

wherein $\Delta E^*w$ represents the color difference between the stained nylon 6 fabric and a non-stained nylon 6 fabric, $\Delta L^*w$ represents a difference in L* value between the stained and non-stained fabrics, $\Delta a^*w$ represents a difference in a* value between the stained and non-stained fabrics, and $\Delta b^*w$ represents a difference in b* value between the stained and non-stained fabrics.

The measurement of the optical density is carried out at a wave length between 400 to 700 nm at which the specimen exhibits a maximum light absorption. The larger the optical density A, the higher the color depth of the resultant dyed polyester fiber material.

When the optical density A is less than 60, the resultant dyed polyester fiber material exhibits an unsatisfactory color depth (color darkness).

When the degree of staining of the undyed nylon 6 adjacent fabric is more than 8.0, the resultant dyed polyester fiber material exhibits an unsatisfactory color fastness to washing.

In another embodiment of the present invention, a polyester fiber material is dyed with a vat dye in accordance with the method of the present invention and the resultant dyed polyester fiber material exhibits:

(1) a degree of dyeability (K/s) of 1.0 or more determined in accordance with a Kubelka-Munk equation (e):

$$K/s = (1-R)^2/2R$$

wherein R represents a light reflection of a specimen of the dyed fiber material, measured at a wave length at which the dyed fiber material specimen exhibits a maximum absorption of light; and (2) a degree of light fastness represented by a color difference $\Delta E^*e$ of 5 or less, the color difference being determined in such a manner that a specimen of the dyed polyester fiber material is subjected to an ultraviolet ray-exposure test at a blackpanel temperature of 89° C. at a relative humidity of 50% for 2 hours, and the tested specimen and a non-tested specimen are subjected to measurements of L* value, a* value and b* value thereof and color difference $\Delta E^*e$ between the tested and non-tested specimens are calculated in accordance with the equation (f):

$$\Delta E^*e = \{(\Delta L^*e)^2 + (\Delta a^*e)^2 + (\Delta b^*e)^2\}^{\frac{1}{2}} \tag{f}$$

in which $\Delta L^*e$ represents a difference in L* value between the tested and non-tested specimens, $\Delta a^*e$ represents a difference in a* value between the tested and non-tested specimens, and $\Delta b^*e$ represents a difference in b* value between the tested and non-tested specimens.

When the dyeability K/s of the vat dye-dyed polyester fiber material is less than 1.0, the color depth of the dyed polyester fiber material is unsatisfactory.

Also, the color difference $\Delta E^*e$ is more than 5, the color fastness to light of the dyed polyester fiber material is unsatisfactory.

In still another embodiment of the present invention, a cationic dye-dyable polyester fiber material is dyed with a metal-chelated phthalocyanine pigment in accordance with the method of the present invention, and the resultant dyed polyester fiber material exhibits a degree of dyeability K/s, as defined above, of 4.0 or more and a light fastness of class 5 or higher.

If the dyeability K/s is less than 4.0, the dyed polyester fiber material exhibits an unsatisfactory color depth and if the light fastness is lower than class 5, the color fastness of the dyed polyester fiber material is unsatisfactory.

EXAMPLES

The present invention will be further explained by way of the following specific examples.

In the examples, the optical density A of the dyed synthetic fiber material was determined by the following method.

The degree of optical density A is defined by the equation (a):

$$A = A' - A'' \tag{a}$$

wherein A represents the optical density of the dyed synthetic fiber material, A' represent an optical density of a solution of the dyed synthetic fiber material calculated from the equation (b):

$$A' = (-\log T)/i\, B \quad (b)$$

in which T represents a light transmittance of a solution of the dyed synthetic fiber material in a solvent B represents a weight in g of the dyed synthetic fiber material contained in the solution in an amount of 50 ml, and A" represents the optical density of a solution of the non-dyed synthetic fiber material in an amount of 1g in the same solvent as mentioned above in an amount of 50 ml; and calculated from the equation (c):

$$A'' = -\log T' \quad (c)$$

in which T' represents a light transmittance of the solution of the non-dyed synthetic fiber material.

Also, the degree of staining of the adjacent fabric attached to a dyed synthetic fiber material for a laundry color fastness test was determined in accordance with Japanese Industrial Standard (JIS) L 0844, A-2 method, in which an undyed nylon 6 fabric was attached to the dyed synthetic fiber material specimen in accordance with JIS L 803-1980. The degree of staining of the nylon 6 adjacent fabric was represented by a color difference between the stained nylon 6 adjacent fabric and a non-stained nylon 6 fabric, calculated in accordance with the equation (d):

$$\Delta E^*w = \{(\{L^*w\})^2 + (\Delta a^*w)^2 + (\Delta b^*w)^2\}^{\frac{1}{2}} \quad (d)$$

wherein $\Delta E^*w$ represents the color difference between the stained nylon 6 fabric and a non-stained nylon 6 fabric, $\Delta L^*w$ represents a difference in L* value between the stained and non-stained fabrics, $\Delta a^*w$ represents a difference in a* value between the stained and non-stained fabrics, and $\Delta b^*w$ represents a difference in b* value between the stained and non-stained fabrics.

The degree of dyeability (K/s) of the dyed synthetic fiber material was determined in accordance with Kubelka-Munk equation (e):

$$K/s = (1-R)^2/2R$$

in such a manner that a dyed synthetic fiber material specimen was placed on a white paper the light reflection R of the dyed specimen was measured by using Macbeth Color-Eye Model M-2020RL (trademark) at a wave length at which the dyed specimen exhibited a minimum absorption of light.

The larger the value of K/s, the higher the color depth (darkness) of the dyed specimen.

The degree of color fastness to light of the dyed synthetic fiber material specimen was represented by a color difference $\Delta E^*e$ which was determined by the following method.

A specimen of the dyed synthetic fiber material was subjected to an ultraviolet ray-exposure using a uV ray-whethering tester (Model: SuV-W13, made by Dainihon Plastic Co.), test at a blackpanel temperature of 89° C. at a relative humidity of 50% for 2 hours, and the tested specimen and a non-tested specimen are subjected to measurements of L* value, a* value and b* value thereof and color difference $\Delta E^*e$ between the tested and non-tested specimens are calculated in accordance with the equation (f):

$$\Delta E^*e = \{(\Delta L^*e)^2 + (\Delta a^*e)^2 + (\Delta b^*e)^2\}^{\frac{1}{2}} \quad (f)$$

in which $\Delta L^*e$ represents a difference in L* value between the tested and non-tested specimens, $\Delta a^*e$ represents a difference in a* value between the tested and non-tested specimens, and $\Delta b^*e$ represents a difference in b* value between the tested and non-tested specimens.

The color fastness of a specimen of dyed synthetic fiber material was measured by a fade test using a fade Ometer at a blackpanel temperature of 63° C. for 20 hours. The degree of color fading was evaluated by using a gray scale and classified into 8 classes. Class 8 is a highest color fastness and class 1 is a lowest color fastness.

Examples 1 to 2 and Comparative Examples 1 to 4

In each of Examples 1 to 2 and Comparative Examples 1 to 4, a plain weave was prepared from polyethylene terephthalate hollow filament warp and weft yarns each having a yarn count of 50 deniers/20 filaments and composed of 24 filamentary segments dissolve-spillable from each other.

The plain weave was subjected to an alkali treatment by which the weight of the plain weave was reduced and each hollow filament was divided into 24 individual extremely fine filaments having a thickness of 0.05 denier.

The resultant extremely fine filament fabric was placed in a stainless steel dyeing autoclave having a high pressure resistance of 20 atmospheres, a dyeing liquid having the composition as indicated below, and the autoclave was closed.

| Dyeing liquid composition | |
|---|---|
| Component | Amount |
| Dye (as shown in Table 1) | As shown in Table 1 |
| Disperse, level-dyeing agent(*)1 | 0.5 g/liter |
| Acetic Acid | 0.2 ml/liter |
| Liquor rate: | 1:40 |

Note: (*)1Trademark: Disper VG, made by Meisei Kagaku K.K.

The closed autoclave was heated in a silicone oil bath and the temperature of the dyeing liquid in the autoclave was raised at a rate of about 2° C./minutes to the level as indicated in Table 1, and the dyeing operation was carried out at this temperature for 60 minutes. During the dyeing operation, the stainless steel dyeing autoclave was continuously shaken for level dyeing of the fabric.

After the dyeing operation was completed, the pressure in the autoclave was reduced to the ambient atmospheric pressure, and the dyed polyester extremely fine filament fabric was taken out from the autoclave, and reduction-cleaned by the following cleaning liquid at a temperature of 80° C. for 20 minutes to remove impurities adhered to the surfaces of the filaments.

| Reduction-cleaning liquid composition | |
|---|---|
| Component | Amount |
| NaOH flakes | 2 g/liter |
| Sodium hydrosulfite | 2 g/liter |

-continued

| Reduction-cleaning liquid composition | |
|---|---|
| Component | Amount |
| Nonionic surfactant (*)2 | 2 g/liter |

Note: (*)2 Trademark: Amirazine D, made by Daiichi Kogyo Seiyaku K.K.

The molecular weights and concentrations of the dyes are shown in Table 1.

TABLE 1

| Item Example No. | Dye Type | Molecular weight | Concentration (% owf) | Dyeing Temperature (°C.) |
|---|---|---|---|---|
| Example | | | | |
| 1 | Resoline Blue BBLS(*)3 | 405 | 25 | 170 |
| 2 | Resoline blue BBLS | 405 | 25 | 150 |
| Comparative Example | | | | |
| 1 | Resoline Blue BBLS | 405 | 100 | 130 |
| 2 | Resoline Blue FBL(*)4 | 350 | 25 | 170 |
| 3 | Resoline Blue FBL | 350 | 25 | 150 |
| 4 | Resoline Blue FBL | 350 | 100 | 130 |

Note:
(*)3 CI Disperse Blue 165
(*)4 CI Disperse Blue 56

The dyeability K/s and staining degree $\Delta E^*$ of the dyed fabrics are shown in Table 2.

TABLE 2

| Item Example No. | Color depth | | Degree of staining | |
|---|---|---|---|---|
| | K/s | Naked eye evaluation | $\Delta E^*$ | Naked eye evaluation |
| Example | | | | |
| 1 | 21.6 | Satisfactory | 3.5 | Slight stainig |
| 2 | 18.0 | " | 7.1 | Slight stainig |
| Comparative Example | | | | |
| 1 | 19.5 | " | 11.4 | Significant staining |
| 2 | 19.4 | " | 11.1 | Significant staining |
| 3 | 17.2 | " | 12.3 | Significant staining |
| 4 | 18.1 | " | 12.8 | Significant staining |

Table 2 clearly indicates that the dyed polyester extremely fine filament fabrics prepared in accordance with the method of the present invention exhibited an excellent color fastness to washing whereas the color depths of the dyed fabrics are satisfactorily high. However, the dyed fabrics of Comparative Examples 1 to 4 exhibited an unsatisfactory color fastness to washing.

Examples 3 and 4 and Comparative Example 5

In each of Examples 3 and 4 and Comparative Example 5, a plain weave was prepared from warp and weft yarns consisting of polyethylene terephthalate filament yarns having a yarn count of 75 deniers/36 filaments.

The fabric was desized, scoured and then heat-treated at a temperature of 190° C. in a conventional manner.

The resultant fabric was dyed by a dyeing liquid having the composition as shown below at the temperature as indicated in Table 3 for 60 minutes.

| Dyeing liquid composition | |
|---|---|
| Component | Amount |
| Disperse dye as indicated in Table 3 | As indicated in Table 3 |
| Disper VG (*)1 | 0.5 g/liter |
| Acetic acid | 0.2 g/liter |
| Liquor ratio: | 1:40 |

The dyed fabric was reduction-cleaned in the same manner as in Example 1.

The optical density A and degree of staining $\Delta E^*w$ by laundry of the resultant dyed fabric are shown in Table 3.

TABLE 3

| Item Example No. | Dye Type | Concentration (% owf) | Dyeing temperature (°C.) | Dyed fabric Optical density A | Degree of staining by laundry $\Delta E^*w$ |
|---|---|---|---|---|---|
| Example | | | | | |
| 3 | Resoline Blue BBLS(*)5 | 50 | 150 | 62 | 4.0 |
| 4 | Resoline Blue BBLS(*)5 | 25 | 170 | 78.2 | 1.4 |
| Comparative Example | | | | | |
| 5 | Resoline Blue BBLS(*)5 | 100 | 130 | 50.2 | 7.2 |

Note: (*)5 CI Disperse Blue 165, made by Bayer, molecular weight: 405

Table 3 clearly shows that the dyed polyester fabrics of Examples 3 and 4 had a satisfactory color fastness to washing, whereas they had a satisfactorily high color depth. Also, from Table 3, it is understood that in accordance with the method of the present invention, a dyed polyester fabric having a high color depth can be obtained by using the disperse dye in an amount similar to or smaller than the amount of the dye used in the conventional dyeing method.

Examples 5 to 7 and Comparative Examples 6 and 7

In each of Examples 5 to 7 and Comparative Examples 6 and 7, a plain weave was produced from polyethylene terephthalate multifilament warp and weft yarns having a yarn count of 75 denier/36 filaments.

The fabric was desized, scoured and heat-treated at a temperature of 190° C. in a conventional manner.

The resultant fabric was dyed by a dyeing liquid having the composition as shown below at the temperature as indicated in Table 4 for 60 minutes.

Dyeing liquid composition

| Component | Amount |
|---|---|
| Vat dye as shown in Table 3 | As shown in Table 4 |
| Disper VG (*)1 | 0.5 g/liter |
| Acetic acid | 0.2 ml/liter |
| Liquor ratio: | 1:40 |

The dyed fabric was reduction-cleaned in the same manner as in Example 1.

The dyeability K/s and degree of light fastness ΔE*e of the resultant dyed fabric are shown in Table 4.

TABLE 4

| Item Example No. | Dye Type | Dye Concentration (% owf) | Dyeing temperature (°C.) | Dyed fabric Color depth K/s | Dyed fabric Color depth Naked eye evaluation | Light color fastness ΔE*e | Light color fastness Naked eye evaluation |
|---|---|---|---|---|---|---|---|
| Example | | | | | | | |
| 5 | Indanthren Brilliant Blue RCL(*)6 | 10 | 150 | 4.3 | Dark | 3.3 | Satisfactory |
| 6 | Indanthren Brilliant Blue RCL(*)6 | 10 | 170 | 4.5 | " | 1.7 | " |
| 7 | Indanthren Red FBB(*)7 | 10 | 150 | 1.7 | " | 3.3 | " |
| Comparative Example | | | | | | | |
| 6 | Indanthren Brilliant Blue RCL | 10 | 130 | 0.4 | Light | 3.5 | " |
| 7 | Indanthren Red FBB | 10 | 130 | 0.6 | " | 1.2 | " |

Note:
(*)6CI Vat Blue 6, made by BASF, molecular weight: 531
(*)7CI Vat Red 10, made by BASF, molecular weight: 470

In Examples 5 to 7, the colors of the dyed fabrics were satisfactorily dark, whereas the colors of the dyed fabrics in Comparative Examples 6 and 7 were unsatisfactorily light.

Also, in Examples 5 to 7, the color changes of the dyed fabrics due to the uV-whethering test were very slight.

Examples 8 to 11 and Comparative Example 10

In each of Examples 8 to 11 and Comparative Example 10, a cationic dye-dyable polyester was prepared by copolymerizing 2.6 molar % of 5-sodium sulfoisophthalate with a polyethylene terephthalate. This cationic dye-dyable polyester resin was converted to multifilament yarns having a yarn count of 75 deniers/36 filaments.

A tubular knitted fabric was prepared from the cationic dye-dyeable polyester multifilament yarns by using a hosiery-knitting machine at a gage of 22.

The tubular knitted fabric was scoured in an aqueous scouring liquid containing 2 g/liter an nonionic surfactant (trademark: Scourol 900, made by Kao K. K., and 1 g/liter of sodium carbonate at a temperature of 80° C. for 30 minutes, and then heat treated at a temperature of 180° C. for one minute.

The heat-treated tubular knitted fabric was dyed in a dyeing liquid containing tetramethylisouronium copper phthalocyanine (molecular weight: 1156) in the concentration as shown in Table 5, 0.5 g/liter of Disper VG and 0.2 ml/liter of acetic acid at a liquor ratio of 1:30, at the temperature of 170° C. for 60 minutes.

The dyed fabric was reduction-cleaned in an aqueous cleaning liquid containing 1 g/liter of sodium hydroxide flakes, 1 g/liter of sodium hydrosulfite and 1 g/liter of Amirazine D, at a temperature of 70° C. for 20 minutes.

The resultant dyed fabric was dried and heat-treated at a temperature of 170° C. for one minute.

The dyeability K/s and the color fastness of the dyed fabric are shown in Table 5.

TABLE 5

| Item Example No. | Concentration of pigment (% owf) | Dyed cationic dye-dyeable fiber fabric Color depth K/s | Dyed cationic dye-dyeable fiber fabric Color depth Naked eye evaluation | Color fastness to light Color fastness (class) | Color fastness to light Color fading (Naked eye evaluation) |
|---|---|---|---|---|---|
| Example | | | | | |
| 8 | 1 | 9.0 | Dark | 5 | very slight |
| 9 | 2 | 14.5 | " | 5 | " |
| 10 | 4 | 20.6 | " | 6 | " |
| 11 | 8 | 22.8 | " | 7 | " |
| Comparative Example | | | | | |
| 10 | 4 | 0.8 | Light | 1 | Significant |

Table 5 clearly shows that the dyed cationic dye-dyable polyester filament fabrics of Examples 8 to 11 exhibited a satisfactory color depth and color fastness to light.

I claim:

1. A method of dyeing a synthetic fiber material, comprising immerse-dyeing a synthetic fiber material having a melting or softening temperature of 160° C. or more in a dyeing liquid containing an organic coloring material having a molecular weight of 370 or more at a temperature of 150° C. or more.

2. The method as claimed in claim 1, wherein the synthetic fiber material comprises polyester fibers having a melting point of 200° C. or more.

3. The method as claimed in claim 2, wherein the polyester fibers contain a thermal decomposition-preventing agent comprising at least one isourea compound of the formula (I):

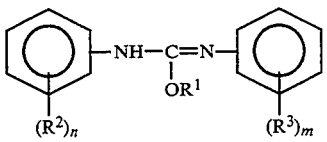

wherein $R^1$, $R^2$ and $R^3$ respectively and independently from each other represent a member selected from the group consisting of unsaturated and saturated aliphatic hydrocarbon groups having 1 to 20 carbon atoms, aromatic hydrocarbon groups having 6 to 10 carbon atoms and cycloaliphatic hydrocarbon groups having 5 to 10 carbon atoms, m and n respectively and independently from each other represent an integer of 1 to 5, and when m or n represents an integer of 2 to 5, the hydrocarbon groups represented by $R^2$ or $R^3$ may be the same as or different from each other, and reacted with the polyester polymer.

4. The method as claimed in claim 1, wherein the organic coloring material comprises at least one member selected from the group consisting of organic dyes and pigments.

5. The method as claimed in claim 4, wherein the organic dyes are selected from the group consisting of disperse dyes and vat dyes.

6. The method as claimed in claim 4, wherein the pigments are selected from phthalocyanine pigments.

7. The method as claimed in claim 6, wherein the phthalocyanine dyes are selected from metal-chelated phthalocyanine pigments.

8. A dyed synthetic fiber material obtained by immerse-dyeing a synthetic fiber material having a melting or softening temperature of 160° C. or more in a dyeing liquid containing an organic coloring material having a molecular weight of 370 or more at a dyeing temperature of 150° C. or more.

9. The dyed synthetic fiber material as claimed in claim 8, wherein the synthetic fiber material comprises polyester fibers having a melting point of 200° C. or more.

10. The dyed synthetic fiber material as claimed in claim 9, wherein the polyester fibers contain a thermal decomposition-preventing agent comprising at least one isourea compound of the formula (I):

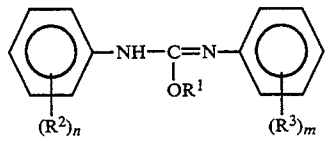

wherein $R^1$, $R^2$ and $R^3$ respectively and independently from each other represent a member selected from the group consisting of unsaturated and saturated aliphatic hydrocarbon groups having 1 to 20 carbon atoms, aromatic hydrocarbon groups having 6 to 10 carbon atoms and cycloaliphatic hydrocarbon groups having 5 to 10 carbon atoms, m and n respectively and independently from each other represent an integer of 1 to 5, and when m or n represents an integer of 2 to 5, the hydrocarbon groups represented by $R^2$ or $R^3$ may be the same as or different from each other, and reacted with the polyester polymer.

11. The dyed synthetic fiber material as claimed in claim 8, wherein the organic coloring material comprises at least one member selected from the group consisting of organic dyes and pigments.

12. The dyed synthetic fiber material as claimed in claim 11, wherein the organic dyes are selected from the group consisting of disperse dyes and vat dyes.

13. The dyed synthetic fiber material as claimed in claim 8, which comprises polyester fibers dyed with a disperse azoic dye, and the resultant dyed polyester fiber material exhibits;

(1) an optical density of 60 or more, determined in accordance with the equation (a):

$$A = A' - A'' \qquad (a)$$

wherein A represents the optical density of the dyed polyester fiber material, $A'$ represents an optical density of a solution of the dyed polyester fiber material calculated from the equation (b):

$$A' = (-\log T)/B \qquad (b)$$

in which T represents a light transmittance of a solution of the dyed polyester fiber material in a solvent consisting of o-chlorophenol and B represents a weight in g of the dyed polyester fiber material contained in the solution in an amount of 50 ml, and $A''$ represents the optical density of a solution of the non-dyed polyester fiber material in an amount of 1 g in the same solvent as mentioned above in an amount of 50 ml; and calculated from the equation (c):

$$A'' = -\log T' \qquad (c)$$

in which $T'$ represents a light transmittance of the solution of the non-dyed polyester fiber material; and (2) a degree of staining of undyed nylon 6 fabric of 8.0 or less, determined by a laundering color fastness test applied to the dyed polyester fiber material in accordance with Japanese Industrial Standard L 0844, A-2 method, which degree of staining being represented by a color difference between the stained nylon 6 fabric attached as an adjacent fabric to the dyed polyester fiber material and a non-stained nylon 6 fabric, calculated in accordance with equation (d):

$$\Delta E^*w = \{(\Delta L^*w)^2 + (\Delta a^*w)^2 + (\Delta b^*w)^2\}^{\frac{1}{2}} \qquad (d)$$

wherein $\Delta E^*w$ represents the color difference between the stained nylon 6 fabric and a non-stained nylon 6 fabric $\Delta L^*w$ represents a difference in $L^*$ value between the stained and non-stained fabrics, $\Delta a^*w$ represents a difference in $a^*$ value between the stained and non-stained fabrics, and $\Delta b^*w$ represents a difference in $b^*$ value between the stained and non-stained fabrics.

14. The dyed synthetic fiber material as claimed in claim 8, which comprises polyester fibers dyed with a vat dye and the resultant dyed polyester fiber material exhibit;

(1) a degree of dyeability (K/s) of 1.0 or more determined in accordance with Kubelka-Munk equation (e):

$$K/s = (1-R)^2/2R$$

wherein R represents a light reflection of a specimen of the dyed fiber material, measured at a wave length at which the dyed fiber material specimen exhibits a maximum absorption of light; and (2) a degree of light fastness represented by a color difference $\Delta E^*e$ of 5 or less, the color difference being determined in such a manner that a specimen of the dyed polyester fiber material are subjected to an ultraviolet ray-exposure test at a blackpanel temperature of 89° C. at a relative humidity of 50% for 2 hours, and the tested specimen and a non-tested specimen are subjected to measurements of $L^*$ value, $a^*$ value and $b^*$ value thereof and color difference $\Delta E^*e$ between the tested and non-tested specimens are calculated in accordance with the equation (f):

$$\Delta E^*e = \{(\Delta L^*e)^2 + (\Delta a^*e)^2 + (\Delta b^*e)^2\}^{\frac{1}{2}} \tag{f}$$

in which $\Delta L^*e$ represents a difference in $L^*$ value between the tested and non-tested specimens, $\Delta a^*e$ represents a difference in $a^*$ value between the tested and non-tested specimens, and $\Delta b^*e$ represents a difference in $b^*$ value between the tested and non-tested specimens.

15. The dyed synthetic fiber material as claimed in claim 11, wherein the pigments are selected from phthalocyanine pigments.

16. The dyed synthetic fiber material as claimed in claim 15, wherein the phthalocyanine pigments are selected from metal-chelated phthalocyanine pigments.

17. The dyed synthetic fiber material as claimed in claim 16, wherein the metal-chelated phthalocyanine pigments are selected from tetramethylisothiouronium metal-chelated phthocyanine pigments.

18. The dyed synthetic fiber material as claimed in claim 8, which is a cationic dye-dyeable polyester fiber material dyed with a metal-chelated phthalocyanine pigment and the resultant dyed polyester fiber material exhibits a degree of dyeability K/s, as defined above, of 4.0 or more and a light fastness of class 5 or higher.

* * * * *